(12) United States Patent
Ku et al.

(10) Patent No.: US 10,508,056 B1
(45) Date of Patent: Dec. 17, 2019

(54) METHOD TO FORM SILICON CARBIDE FIBERS BY SINGLE STAGE PYROLYSIS OF POLYSILAZANE PRECURSORS

(71) Applicant: GENERAL ELECTRIC COMPANY, Schenectady, NY (US)

(72) Inventors: Anthony Yu-Chung Ku, Rexford, NY (US); Gary C. Buczkowski, Scotia, NY (US); Ryan Christopher Mills, Rexford, NY (US); Peter Kennedy Davis, Niskayuna, NY (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 298 days.

(21) Appl. No.: 15/096,495

(22) Filed: Apr. 12, 2016

Related U.S. Application Data

(60) Provisional application No. 62/163,628, filed on May 19, 2015.

(51) Int. Cl.
| | | |
|---|---|---|
| *C04B 35/571* | (2006.01) | |
| *D01F 9/10* | (2006.01) | |
| *C01B 32/956* | (2017.01) | |
| *C04B 35/622* | (2006.01) | |

(52) U.S. Cl.
CPC .......... *C04B 35/571* (2013.01); *C01B 32/956* (2017.08); *C04B 35/62281* (2013.01); *D01F 9/10* (2013.01); *C01P 2004/61* (2013.01); *C04B 2235/96* (2013.01)

(58) Field of Classification Search
CPC ................ C04B 35/62281; C04B 35/571
See application file for complete search history.

(56) References Cited

U.S. PATENT DOCUMENTS

| | | | | |
|---|---|---|---|---|
| 3,853,567 A * | 12/1974 | Verbeek | ............. | C01B 21/0828 501/90 |
| 3,892,583 A * | 7/1975 | Winter | ............... | C01B 21/0828 501/92 |
| 4,097,294 A * | 6/1978 | Rice | ...................... | C04B 35/563 264/625 |
| 4,404,153 A | 9/1983 | Gaul, Jr. | | |
| 4,757,035 A * | 7/1988 | Baney | ................... | C04B 35/571 501/88 |
| 4,942,011 A * | 7/1990 | Bolt | ...................... | C04B 35/571 264/210.6 |
| 5,041,515 A * | 8/1991 | Takeda | .................. | C04B 35/571 528/34 |
| 5,164,344 A * | 11/1992 | Zank | ..................... | C04B 35/571 264/625 |
| 5,268,336 A * | 12/1993 | Deleeuw | ............... | C04B 35/571 264/433 |
| 5,792,416 A * | 8/1998 | Sacks | .................... | C04B 35/571 264/625 |
| 5,824,281 A * | 10/1998 | Ichikawa | ............. | C04B 35/571 423/345 |

(Continued)

*Primary Examiner* — Erin Snelting
(74) *Attorney, Agent, or Firm* — Fletcher Yoder, P.C.

(57) ABSTRACT

Disclosed herein are methods of forming substantially crystalline, dense silicon carbide fibers from infusible polysilazane fibers by utilizing a single stage pyrolysis. The pyrolysis is performed using a continuous process in a single furnace with a constant atmospheric condition. Also disclosed are substantially crystalline, dense silicon carbide fibers formed by these methods.

19 Claims, 6 Drawing Sheets

(56) References Cited

U.S. PATENT DOCUMENTS

| | | | |
|---|---|---|---|
| 5,851,942 A * | 12/1998 | Sacks | C04B 35/571 501/95.1 |
| 5,863,848 A | 1/1999 | Bujalski et al. | |
| 5,928,978 A | 7/1999 | Barnard et al. | |
| 5,945,362 A * | 8/1999 | Ishikawa | C04B 35/571 501/88 |
| 5,948,714 A * | 9/1999 | Ishikawa | C04B 35/571 501/88 |
| 6,040,008 A * | 3/2000 | Sacks | C04B 35/62281 427/226 |
| 6,069,102 A * | 5/2000 | Sacks | C04B 35/565 264/625 |
| 6,743,393 B1 * | 6/2004 | Petrak | C04B 35/565 264/624 |
| 8,940,391 B2 * | 1/2015 | Garnier | B82Y 30/00 428/293.4 |
| 9,096,702 B2 * | 8/2015 | Bauer | C04B 35/62281 |
| 2011/0212329 A1 | 9/2011 | Pope et al. | |
| 2012/0237765 A1 * | 9/2012 | Pope | C01B 31/36 428/367 |
| 2015/0018448 A1 | 1/2015 | Davis et al. | |

\* cited by examiner

METHOD TO FORM SILICON CARBIDE FIBERS BY SINGLE STAGE PYROLYSIS OF POLYSILAZANE PRECURSORS

BACKGROUND

This disclosure relates to methods of forming silicon carbide fibers. More particularly, this invention relates to forming silicon carbide fibers from infusible polysilazane fibers by utilizing one continuous heating step.

High-strength, fine diameter silicon carbide (SiC) fibers are needed for ceramic matrix composites (CMCs). Polymer-derived ceramics are spun into fibers and heat treated to achieve the strength necessary for use in various applications. Currently, precursor ceramic polymer fiber wound on a spool is run through a pyrolysis process with two heating stages to another spool. One such method for polycarbosilanes is described in U.S. Pat. No. 5,928,978. In the first step, a precursor ceramic polymer fiber is heated at a temperature sufficient to convert the polymer to glass (for instance, about 900° C. to 1200° C.). This temperature is then held to fully convert the polymer into the glass. In a second heating step, the glass is heated to a temperature sufficient to convert it to crystalline ceramic (for instance, greater than 1800° C.). At least one of the heating steps is typically at a temperature high enough to allow outgassing to occur. If any step in this type of process is completed too quickly, if the ramp rate is too high, or if there is not enough hold time, various undesirable properties may be found in the resulting ceramic fiber, such as fracture of the fiber, shrinkage, or lack of removal of impurities. Conversely, if the fibers are in the hot zone for too long, or if the temperature is too high, the crystalline fiber may develop large grains which reduce the tensile strength. In another exemplary two-step process, Hi-Nicalon fibers are made by converting precursor polycarbosilane fibers into silicon carbide fibers by heating at 200° C. in air to cross-link the structures, then forming ceramic fibers by heating to 1200° C. in an inert atmosphere. In another process, a near stoichiometric polyaluminocarbosilane fiber has been developed which is cured by oxidation and utilizes a two stage pyrolysis, the first to 1300° C. (for formation of oxygen-rich silicon carbide fiber), and the second to 1800° C. (for the outgassing of CO and sintering).

In order to accommodate a process with two required, disparate temperature conditions, the current two-step heating processes require either two separate furnaces or a larger furnace that allows for the presence of two different heating zones. A single-stage heating process would provide beneficial process simplicity, including shorter treatment times and lower capital investment in furnace equipment.

Therefore, there is a need for a process for forming silicon carbide fibers utilizing a single heating stage.

SUMMARY OF THE INVENTION

In one aspect, the disclosure provides a method for producing a substantially crystalline, dense silicon carbide fiber having a diameter between 1 μm and 50 μm. The method includes providing an infusible polysilazane fiber, and heating the infusible polysilazane fiber in a continuous process in a single furnace with constant atmospheric condition to a maximum temperature between 1750° C. and 2150° C. for a time between 1 minute and 15 minutes. This method converts the infusible polysilazane fiber to a substantially crystalline, dense silicon carbide fiber.

In a second aspect, the disclosure provides a substantially crystalline, dense silicon carbide fiber having a diameter between 1 μm and 50 μm. The dense, crystalline silicon carbide fiber is formed by providing an infusible polysilazane fiber, and heating the infusible polysilazane fiber in a continuous process in a single furnace with constant atmospheric condition to a maximum temperature between 1750° C. and 2150° C. for a time between 1 minute and 15 minutes.

DRAWINGS

These and other features, aspects, and advantages of the present invention will become better understood when the following detailed description is read with reference to the accompanying drawings in which like characters represent like parts throughout the drawings, wherein.

Figure 3:
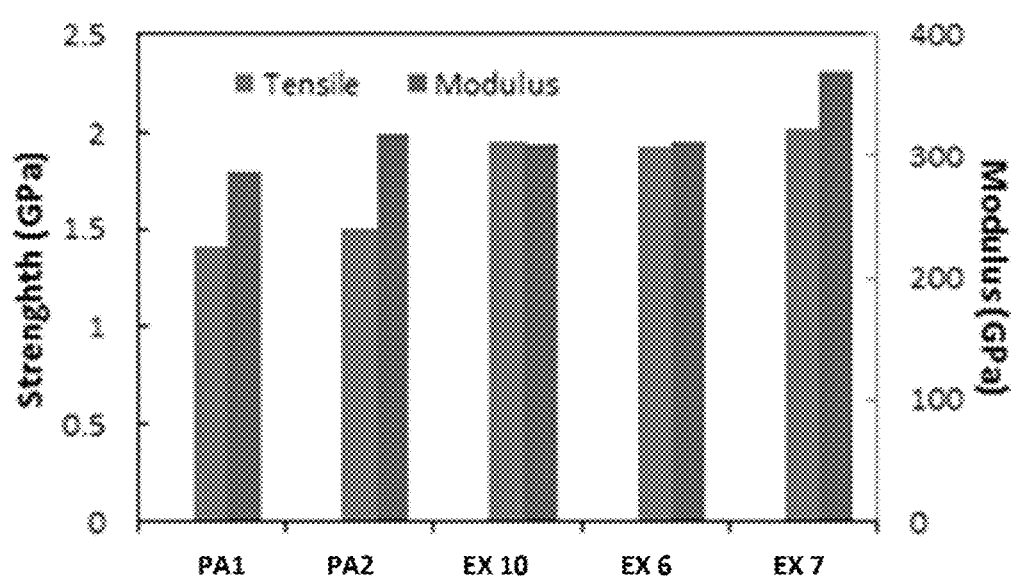

FIG. 3 compares the tensile strength and modulus of prior art examples and examples formed by embodiments of the processes disclosed herein.

Figure 4:
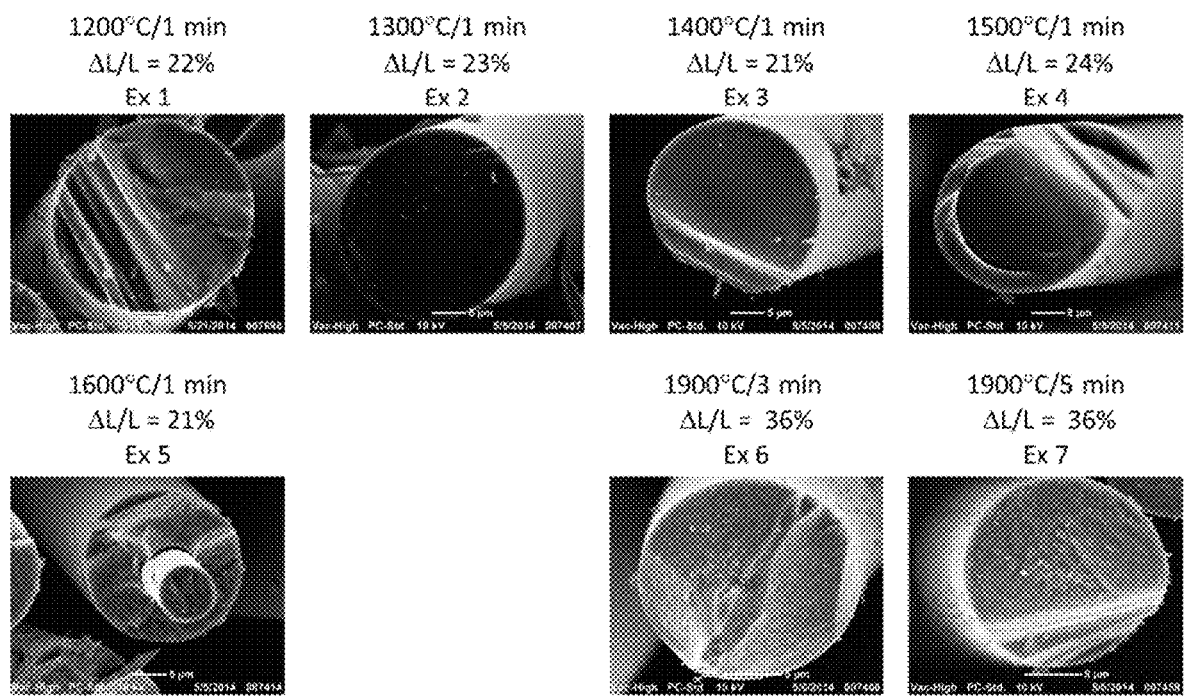

FIG. 4 shows SEM images of fibers pyrolyzed in a single pass at different peak temperatures.

Figure 5:
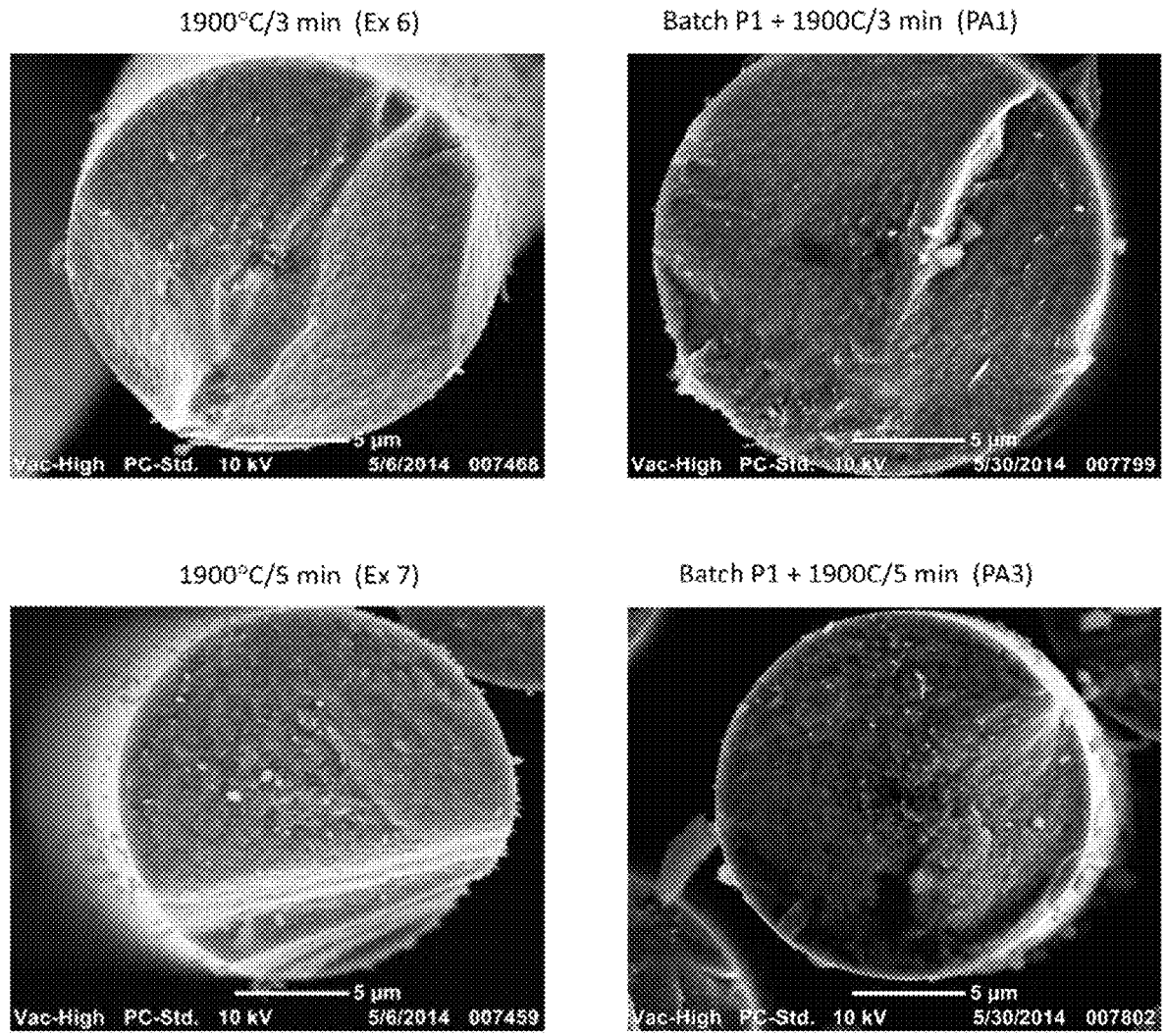

FIG. 5 shows microstructures of silicon carbide fibers formed by embodiments of the processes disclosed herein.

Figure 6:
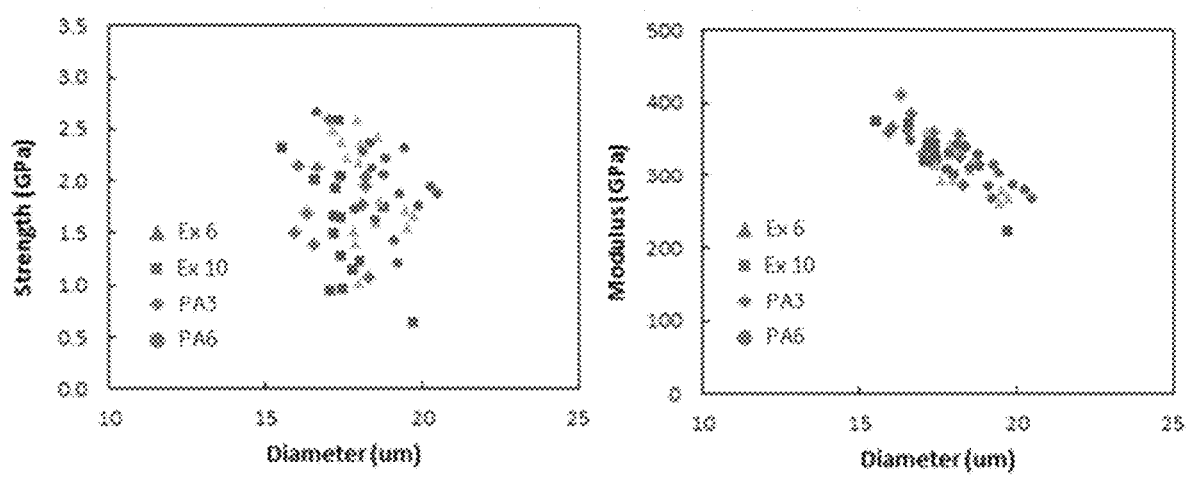
Figure 6:
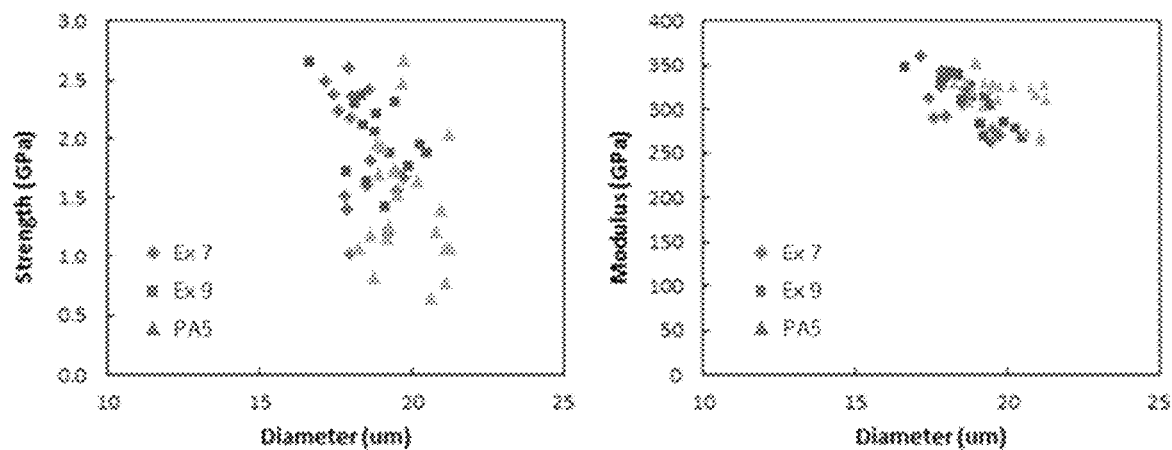

FIG. 6 shows graphs comparing fiber diameter with Young's modulus values of prior art examples and examples formed by embodiments of the processes disclosed herein.

DETAILED DESCRIPTION

Each embodiment presented below facilitates the explanation of certain aspects of the disclosure, and should not be interpreted as limiting the scope of the disclosure. Moreover, approximating language, as used herein throughout the specification and claims, may be applied to modify any quantitative representation that could permissibly vary without resulting in a change in the basic function to which it is related. Accordingly, a value modified by a term or terms, such as "about," is not limited to the precise value specified. In some instances, the approximating language may correspond to the precision of an instrument for measuring the value.

In the following specification and claims, the singular forms "a", "an" and "the" include plural referents unless the context clearly dictates otherwise. As used herein, the terms "may" and "may be" indicate a possibility of an occurrence within a set of circumstances; a possession of a specified property, characteristic or function; and/or qualify another verb by expressing one or more of an ability, capability, or possibility associated with the qualified verb. Accordingly, usage of "may" and "may be" indicates that a modified term is apparently appropriate, capable, or suitable for an indicated capacity, function, or usage, while taking into account that in some circumstances, the modified term may sometimes not be appropriate, capable, or suitable.

Figure 1:
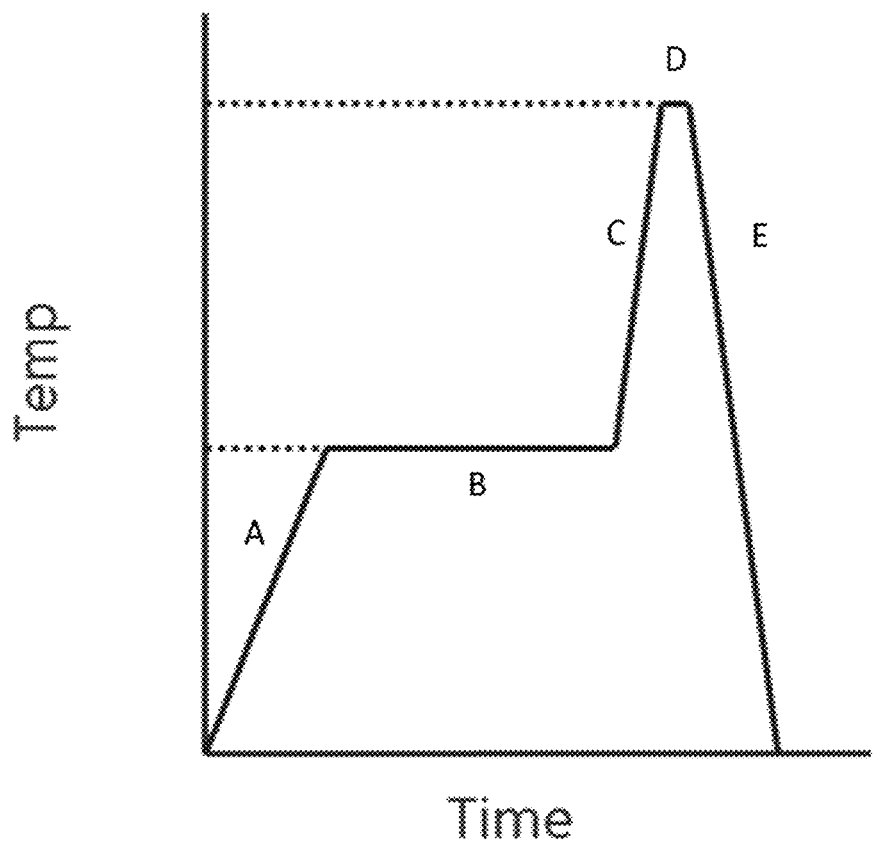
FIG. 1 is an illustration of a time vs. temperature curve of a two-step pyrolysis found in the prior art.

Polysilazane materials (such as infusible polysilazane fibers) can be converted into silicon carbide SiC. This is currently done using a two-step pyrolysis process, as described above and as shown in FIG. 1. FIG. 1 depicts an example of a time vs. temperature curve of a two-step pyrolysis found in the prior art. In this illustration, A represents the first heating step from ambient temperature to a temperature that will be sufficient to convert the infusible polysilazane fiber to glass. This temperature is then held for a length of time to allow the conversion to glass to occur; this step is represented by B in FIG. 1. Another heating step is then performed (C) to convert the glass to a crystalline silicon carbide. At least one of the heating steps should be at a temperature high enough to allow outgassing to occur: in general, the first heating step removes organics, such as $H_2$ and methane, while the second heating step removes oxygen and/or nitrogen. For polysilazane, it is often necessary to have temperatures of greater than 1500° C. to substantially remove residual oxygen and nitrogen via carbothermal decomposition. It may be possible to have a lower maximum process temperature if a different precursor, such as polycarbosilane, is used. As can be seen in FIG. 1, the ramp rate of step C is often faster than that of step A. This higher temperature is then held for a length of time D to ensure the conversion to crystalline fiber. Finally, the heat is removed and the sample is cooled, as shown in step E.

The processes disclosed herein, in contrast, are single-stage continuous (e.g., spool-to-spool) heating processes for forming crystalline silicon carbide fibers, as opposed to the currently used two-stage heating processes. The single-stage heating process provides many benefits over a two-stage heating process. Single-stage heating is faster, because the fiber does not have to be held at a specific intermediate temperature for a precise amount of time, then held at another temperature for another length of time. There also is less handling of the fiber. Finally, less equipment is necessary, resulting in a silicon carbide fiber formation process that is less expensive than currently-used methods.

Figure 2:
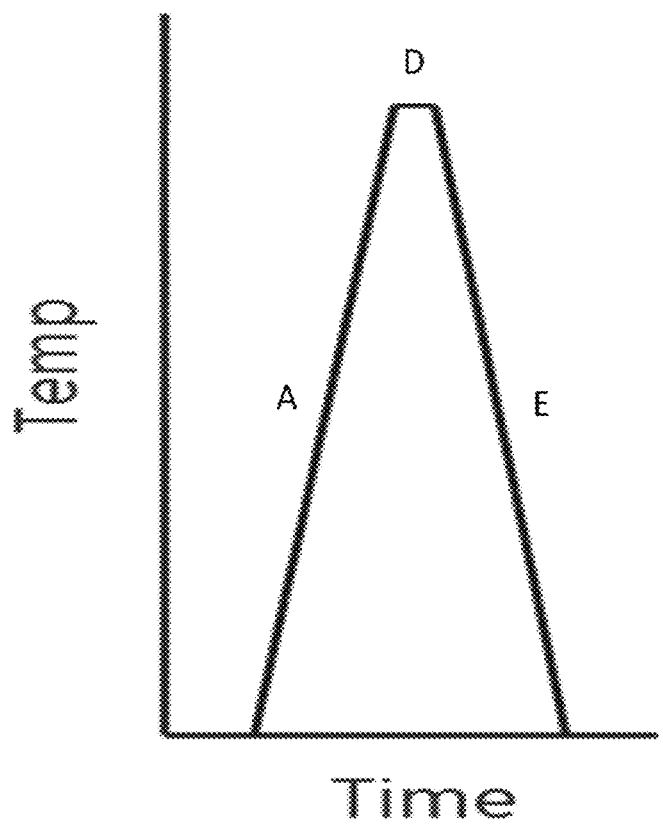
FIG. 2 is a time vs. temperature curve of the present disclosure.)

FIG. 2 illustrates an example of a time vs. temperature curve using the process disclosed herein. This process is easily distinguished over that of the prior art example shown in FIG. 1. As in FIG. 1, the process disclosed herein possesses an initial heating step A. Unlike in FIG. 1, however, this is the only heating step in the entire process. Step A shows a single heating step, from ambient temperature to a temperature sufficient to convert an infusible polysilazane fiber to a dense, crystalline silicon carbide fiber. This maximum temperature is then held for a length of time sufficient to complete this conversion D, and the sample is cooled E.

The relationship between ramp rate, peak temperature, spool speed, and hot zone length may be varied to tailor the processes disclosed herein. For instance, if the furnace (or hot zone) length is short, the ramp rate may be increased, the maximum temperature may be increased, and/or the spool speed may be decreased. These adjustments should be made to satisfy the requirements and limits of the material being used; a temperature or ramp rate that is too high, for instance, may result in the breakage or a loss of strength in the fiber.

In one aspect, the disclosure provides a method for producing a substantially crystalline, dense silicon carbide fiber having a diameter between 1 μm and 50 μm. In some embodiments, the diameter is between 5 μm and 20 μm. In some embodiments, the diameter is between 10 μm and 15 μm. In some embodiments, the diameter is between 5 μm and 40 μm. In some embodiments, the diameter is between 10 μm and 30 μm. In some embodiments, the diameter is between 15 μm and 25 μm. In some embodiments, the diameter is between 5 μm and 15 μm. In some embodiments, the diameter is between 8 μm and 18 μm.

The method includes heating an infusible polysilazane fiber. In some embodiments, the infusible polysilazane fiber has a diameter between 2 μm and 110 μm. In some embodiments, the infusible polysilazane fiber has a diameter between 2 μm and 50 μm. In some embodiments, the infusible polysilazane fiber has a diameter between 2 μm and 25 μm. In some embodiments, the infusible polysilazane fiber has a diameter between 2 μm and 20 μm. In some embodiments, the infusible polysilazane fiber has a diameter between 5 and 25 μm. In some embodiments, the infusible polysilazane fiber has a diameter between 5 and 20 μm. In some embodiments, the infusible polysilazane fiber has a diameter between 5 and 15 μm. In some embodiments, the infusible polysilazane fiber has a diameter between 15 and 30 μm. In some embodiments, the infusible polysilazane fiber has a diameter between 20 and 30 μm. In some embodiments, the infusible polysilazane fiber has a diameter between 15 and 25 μm. In some embodiments, the infusible polysilazane fiber has a diameter between 20 and 25 μm. In some embodiments, the infusible polysilazane fiber has a diameter between 10 and 25 μm. The diameter of the infusible polysilazane fiber (polymer) should be large enough to mitigate breakage of the fiber, yet small enough to allow for proper outgassing and heat treatment throughout the fiber's entire thickness. The infusible polysilazane fiber shrinks during the heat treatment, becoming more dense. It is not uncommon for the diameter of the fiber to decrease from about 20-25 μm to about 10-15 μm during the heating process, or for the density of the fiber to increase from about 1 g/cc to about 3 g/cc.

The infusible polysilazane fiber is heated in a continuous process in a single furnace with constant atmospheric condition. The continuous process keeps the fiber moving through the furnace, as opposed to a batch process, wherein a fiber is placed in a furnace and remains stationary for the desired period of time. In some embodiments, the continuous process is a spool-to-spool process. Only a single furnace is utilized in this method, and the furnace has a single, constant atmospheric condition. "Constant atmospheric condition," for purposes of this disclosure, means that the atmosphere within the furnace is of the same atmosphere throughout the heat treatment zone. In some embodiments, the constant atmospheric condition is a noble gas atmosphere. In other embodiments, the noble gas atmosphere is helium. In still other embodiments, the noble gas atmosphere is neon. In yet other embodiments, the noble gas atmosphere is argon. In some embodiments, the constant atmospheric condition is a mixture of more than one noble gas. A vacuum furnace is not indicated for this use. The temperature is not necessarily constant throughout the treatment zone.

The infusible polysilazane fiber is heated in the furnace to a maximum temperature between 1750° C. and 2150° C. for a time between 1 minute and 15 minutes. To be perfectly clear, the fiber itself is heated to the indicated temperature and held at that temperature for the indicated period of time. Heating under these conditions converts the infusible polysilazane fiber to a substantially crystalline, dense silicon carbide fiber. In some embodiments, the temperature is between 1850° C. and 2050° C. In other embodiments, the temperature is between 1850° C. and 1950° C. In still other embodiments, the temperature is between 1750° C. and 1850° C. In yet other embodiments, the temperature is between 2050° C. and 2150° C. In some embodiments, the temperature is between 1800° C. and 2100° C. In other embodiments, the temperature is between 1800° C. and 2000° C. In still other embodiments, the temperature is between 1800° C. and 1900° C. In some embodiments, the temperature is between 1900° C. and 2100° C. In some embodiments, the time is between 1 minute and 10 minutes. In some embodiments, the time is between 2 minute and 10 minutes. In other embodiments, the time is between 3 minutes and 10 minutes. In still other embodiments, the time is between 2 minutes and 5 minutes. In yet other embodiments, the time is between 3 minutes and 5 minutes.

There is a balance between having a ramp rate that is too fast, which could damage the fiber, and too slow, which could increase the time and cost of producing the fiber. In some embodiments, the heating to get to the maximum temperature occurs at a ramp rate of between 10° C./minute and 1500° C./minute. In some embodiments, the heating occurs at a ramp rate of between 100° C./minute and 1000° C./minute. In some embodiments, the heating occurs at a ramp rate of between 450° C./minute and 650° C./minute. In other embodiments, the heating occurs at a ramp rate of between 500° C./minute and 650° C./minute. In some embodiments, the heating occurs at a ramp rate of between 500° C./minute and 1000° C./minute. In other embodiments, the heating occurs at a ramp rate of between 900° C./minute and 1000° C./minute. In still other embodiments, the heating occurs at a ramp rate of between 850° C./minute and 1000° C./minute. In some embodiments, the heating occurs at a ramp rate of between 500° C./minute and 600° C./minute. In yet other embodiments, the heating occurs at a ramp rate of between 250° C./minute and 750° C./minute. In some embodiments, the heating occurs at a ramp rate of between 500° C./minute and 750° C./minute. In still other embodiments, the heating occurs at a ramp rate of between 100° C./minute and 400° C./minute. In yet other embodiments, the heating occurs at a ramp rate of between 200° C./minute and 400° C./minute. In some embodiments, the heating occurs at a ramp rate of between 150° C./minute and 350° C./minute. In other embodiments, the heating occurs at a ramp rate of between 200° C./minute and 300° C./minute.

In some embodiments, the method includes heating an infusible polysilazane fiber to a maximum temperature between 1800° C. and 2100° C. for a time between 2 minutes and 10 minutes to convert the infusible polysilazane fiber to a substantially crystalline, dense silicon carbide fiber. In some of these embodiments, the time is between 3 minutes and 5 minutes. In some of these embodiments, the heating occurs at a ramp rate of between 500° C./minute and 650° C./minute. In some of these embodiments, the heating occurs at a ramp rate of between 200° C./minute and 300° C./minute. In some of these embodiments, the heating occurs at a ramp rate of between 150° C./minute and 350° C./minute. In some of these embodiments, the heating occurs at a ramp rate of between 850° C./minute and 1000° C./minute. In some of these embodiments, the heating occurs at a ramp rate of between 150° C./minute and 350° C./minute, the maximum temperature is between 1850° C. and 1950° C., and the time is between 2 minutes and 5 minutes.

In another aspect, the disclosure relates to a substantially crystalline, dense silicon carbide fiber having a diameter between 1 μm and 50 μm. The dense, crystalline silicon carbide fiber is formed by providing an infusible polysilazane fiber, and heating the infusible polysilazane fiber in a continuous process in a single furnace with constant atmospheric condition to a maximum temperature between 1750° C. and 2150° C. for a time between 1 minute and 15 minutes. All other ranges described herein (e.g., time, temperature, ramp time, etc.) related to the methods of the disclosure are applicable here.

In another aspect, the disclosure relates to a substantially crystalline, dense silicon carbide fiber having a diameter between 1 μm and 50 μm formed by a method described herein.

Ideally, the silicon carbide fiber will be fully crystalline after the heating step. However, the person of skill in the art would understand the silicon carbide fiber may not be fully crystalline, in that there may be some regions of non-crystallinity or other phases. For purposes of this disclosure, "substantially crystalline" represents a silicon carbide fiber that is fully crystalline or substantially crystalline. "Substantially crystalline" is defined as a silicon carbide fiber with a XRD diffraction pattern consistent with beta silicon carbide.

The disclosed process produces a substantially crystalline, dense silicon carbide fiber. "Dense", for purposes of this disclosure, is defined as a silicon carbide fiber having a Young's modulus of greater than 300 GPa. In some embodiments, the silicon carbide fiber has a Young's modulus between 300 GPa and 400 GPa.

It may be possible to make silicon carbide fibers of similar quality using only a single batch furnace. To accomplish this, however, the process requires holding the fibers for long periods of time at relatively low temperatures, which takes many hours to complete. The continuous process disclosed herein takes only minutes to form substantially crystalline, dense silicon carbide fibers.

Silicon carbide fibers formed by the processes disclosed herein have been found to have fewer surface defects and to be of at least comparable strength to those fibers formed by prior two-stage heating processes. FIG. 3 illustrates the tensile strength and modulus of two prior art examples compared with examples formed by embodiments of the processes disclosed herein. PA1 and PA2 are examples of SiC fibers formed by a two-step pyrolysis disclosed in the prior art. PA1 was heated at 1100° C. for three minutes, then at 1900° C. for three minutes, while PA2 was heated at 1100° C. for five minutes, then at 1900° C. for three minutes. The next three entries are examples of SiC fibers formed by the single-step process disclosed herein. Both Examples 10 and 6 were heated to 1900° C. for three minutes at a continuous ramp rate, while Example 7 was heated to 1900° C. for five minutes at a continuous ramp rate. In addition to requiring fewer steps and less time, the graph shows that the modulus values of Examples 10, 6 and 7 are at least comparable to those of the prior art examples, while the tensile strength values of the inventive examples appear to be better than those of the examples of the prior art.

EXAMPLES

Combined Pyrolysis

A series of continuous pyrolysis experiments was performed in a graphite tube furnace to demonstrate the utility of direct continuous conversion of the polymer to SiC. The furnace had a hot zone length of 8 inches and an Argon atmosphere. FIG. 4 shows the microstructure of fibers exposed to different peak temperatures from 1100 to 1900° C. in a single pass continuous pyrolysis. In a typical experiment, carbon leaders were attached at either end of the fiber sample, and the tow (a collection of individual fiber filaments) was run through a graphite furnace at a constant winding rate, under flowing argon. The tow was collected after passing through the furnace, the carbon leaders were cut off, and individual filaments were tested for their mechanical properties. Filaments in the tow were also examined using SEM.

The microstructural evolution with temperature tracked the evolution observed in fibers processed using a standard multi-step profile. Namely, fibers treated between 1100 and 1400° C. exhibited a smooth microstructure, indicative of glass. Fibers exposed to temperatures between 1500 and 1600° C. showed a core-shell transition with increasing progress in decomposition, and fibers exposed to 1900° C. showed evidence of densification and sintering.

Fibers directly pyrolyzed to SiC were shown to have a dense intergranular shell surrounding a fine-grained interior, as seen in the last two pictures in FIG. 4; this type of microstructure is commonly seen. The microstructure as well as the net linear shrinkage was consistent with fiber processed in two steps, using a first pyrolysis (P1) step at 1100° C. followed by a second pyrolysis (P2) step at up to 1900° C.

Mechanical Properties

The mechanical properties of the fiber processed using combined continuous pyrolysis, as describe herein, compared well to those of fibers processed using a two-step thermal profile. Strength, diameter and modulus measurements were performed on sets of individual filaments made using a two-step pyrolysis and the combined continuous pyrolysis processes. Separate filaments were mounted and tested using a standard procedure described earlier. Data are reported in Table 1 for fibers prepared using two different winding rates, corresponding to residence times of 3 and 5 minutes. No statistical differences were found between the tensile strength or modulus of fibers prepared using the continuous or two-step pyrolysis. In addition, longer dwell times at the peak temperature caused a slight increase in the tensile strength for both modes of pyrolysis, but the differences were not statistically significant. The peak individual filament strength was taken as an indicator of the entitlement for each experiment. Values ranged from 2.6 to 3.9 GPa, with no trends related to processing conditions.

stronger trend with diameter in fibers prepared using a continuous process as disclosed herein. This can be seen in FIG. 6.

All publications and patent references cited in this specification are herein incorporated by reference as if each individual publication were specifically and individually indicated to be incorporated by reference herein as though fully set forth.

Subject matter incorporated by reference is not considered to be an alternative to any claim limitations, unless otherwise explicitly indicated.

Where one or more ranges are referred to throughout this specification, each range is intended to be a shorthand format for presenting information, where the range is understood to encompass each discrete point within the range as if the same were fully set forth herein. Additionally, when a range is disclosed, it is meant to include any and all subranges therein.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the various embodiments without departing from their scope. While the dimensions and types of materials described herein are intended to define the parameters of the various embodiments, they are by no means limiting and are merely exemplary. Many other embodiments will be apparent to those of skill in the art upon reviewing the above description. The scope of the various embodiments should, therefore, be determined with

TABLE 1

Summary of mechanical properties for SiC fiber pyrolyzed using different approaches

| Sample ID | P1 + P2 | | | Combined | | |
|---|---|---|---|---|---|---|
| | PA1 | PA2 | PA3 | Ex. 6 | Ex. 8 | Ex. 7 |
| Thermal profile | Batch 1100 C + 1900 C/3 min | Batch 1100 C + 1900° C./3 min | Batch 1100 C + 1900C/5 min | 1900 C/3 min | 1900 C/3 min | 1900 C/5 min |
| Properties | | | | | | |
| # filaments tested | 20 | 17 | 18 | 15 | 35 | 12 |
| Diameter | 16.5 ± 1.2 um | 15.1 um ± 1.5 um | 15.7 ± 0.6 um | 18.3 ± 0.8 um | 17.5 ± 1.2 um | 16.9 ± 1.3 um |
| Tensile strength | | | | | | |
| Average | 2.1 ± 0.5 GPa | 1.9 ± 0.4 GPa | 2.1. ± 0.4 GPa | 1.9 ± 0.5 GPa | 1.7 ± 0.5 GPa | 2.0 ± 0.7 GPa |
| Maximum | 3.4 GPa | 2.8 GPa | 2.8 GPa | 2.6 GPa | 2.8 GPa | 3.9 GPa |
| Young's modulus | 330 ± 30 GPa | 370 ± 70 GPa | 330 ± 20 GPa | 310 ± 30 GPa | 340 ± 30 GPa | 370 ± 70 GPa |
| Weibull modulus | 5.0 | 6.6 | 6.1 | 4.5 | 4.5 | 3.6 |

Fibers made using the combined pyrolysis approach showed average larger diameters. SEM examination of the microstructures showed similar qualitative features. Fibers of approximately the same diameter are shown in FIG. 5; the combined pyrolysis approach samples are shown on the left two pictures, while the two-step pyrolysis (P1+P2) examples are on the right. There did not appear to be any obvious differences in the samples at low magnification.

The difference in average diameter did not correlate with a difference in strength. Though the average values don't show a statistical difference, the Young's modulus has a reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112, sixth paragraph, unless and until such claim limitations expressly use the phrase "means for" followed by a statement of function void of further structure. It is to be understood that not necessarily all such objects or advantages described above may be achieved in accordance with any particular embodiment. Thus, for example, those skilled in the art will recognize that the systems and techniques described herein may be embodied or carried out in a manner that achieves or optimizes one advantage or group of advantages as taught herein without necessarily achieving other objects or advantages as may be taught or suggested herein.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the disclosure may include only some of the described embodiments. Accordingly, the invention is not to be seen as limited by the foregoing description, but is only limited by the scope of the appended claims.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The present invention has been described in terms of some specific embodiments. They are intended for illustration only, and should not be construed as being limiting in any way. Thus, it should be understood that modifications can be made thereto, which are within the scope of the invention and the appended claims. Furthermore, all of the patents, patent applications, articles, and texts which are mentioned above are incorporated herein by reference.

The invention claimed is:

1. A method for producing a substantially crystalline, dense silicon carbide fiber having a diameter between 1 µm and 50 µm, said method comprising:
heating an infusible polysilazane fiber
(1) in a continuous process in a single furnace with constant atmospheric condition, wherein the infusible polysilazane fiber continuously moves through the single furnace and the infusible polysilazane fiber is heated at a continuous ramp rate;
(2) to a maximum temperature between 1750° C. and 2150° C.;
(3) the infusible polysilazane fiber is heated at the maximum temperature for a time between 1 minute and 15 minutes;
whereby said infusible polysilazane fiber is converted to a substantially crystalline, dense silicon carbide fiber.

2. The method according to claim 1, wherein said maximum temperature is between 1850° C. and 2050° C.

3. The method according to claim 2, wherein said maximum temperature is between 1850° C. and 1950° C.

4. The method according to claim 1, wherein said heating occurs at a ramp rate of between 100° C./minute and 1500° C./minute.

5. The method according to claim 4, wherein said ramp rate is between 200° C./minute and 1000° C./minute.

6. The method according to claim 4, wherein said ramp rate is between 200° C./minute and 300° C./minute.

7. The method according to claim 1, wherein said continuous process is a spool-to-spool process.

8. The method according to claim 1, wherein said time is between 1 minute and 10 minutes.

9. The method according to claim 8, wherein said time is between 3 minutes and 10 minutes.

10. The method according to claim 9, wherein said time is between 2 minutes and 5 minutes.

11. The method according to claim 1, wherein said silicon carbide fiber has a diameter between 5 µm and 20 µm.

12. The method according to claim 11, wherein said silicon carbide fiber has a diameter between 10 µm and 15 µm.

13. The method according to claim 1, wherein said constant atmospheric condition is a noble gas atmosphere.

14. The method according to claim 13, wherein said noble gas atmosphere is selected from at least one of helium, neon, or argon.

15. The method according to claim 1, wherein the infusible polysilazane fiber is heated to a maximum temperature between 1800° C. and 2100° C. and the infusible polysilazane fiber is heated at the maximum temperature for a time between 2 minutes and 10 minutes.

16. The method according to claim 15, wherein said time is between 3 minutes and 5 minutes.

17. The method according to claim 15, wherein said heating occurs at a ramp rate of between 100° C./minute and 300° C./minute.

18. The method according to claim 15, wherein said heating occurs at a ramp rate of between 600° C./minute and 1000° C./minute.

19. The method according to claim 15, wherein said heating occurs at a ramp rate of between 100° C./minute and 300° C./minute; said maximum temperature is between 1850° C. and 1950° C.; and said time is between 2 minutes and 5 minutes.

* * * * *